United States Patent Office 3,214,464
Patented Oct. 26, 1965

3,214,464
SELECTED SULFUR DERIVATIVES OF PENTA-CHLOROBUTADIENE AND THE SYNTHESIS THEREOF
Edward G. Howard, Jr., Hockessin, Del., assignor to E. I. du Pont de Nemours and Company, Wilmington, Del., a corporation of Delaware
No Drawing. Filed Mar. 30, 1961, Ser. No. 99,349
12 Claims. (Cl. 260—513)

This invention relates to, and has as its principal objects provision of, certain novel sulfur derivatives of pentachlorobutadiene and methods for the preparation of the same.

The present invention provides now compounds of the formula:

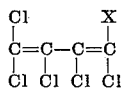

wherein X is —SCl, —SO$_2$Cl, —SO$_2$OR', and —SO$_2$NR'$_2$, where R' is hydrogen or hydrocarbon, especially lower alkyl, i.e., of up to 7 carbons.

The above-mentioned novel compounds are prepared according to the invention directly or indirectly from hexachloro-1,3-butadiene, $Cl_2C=CCl—ClC=CCl_2$, by way of certain pentachloro-1,3-butadienyl thioethers as intermediates (for preparation see U.S. Patent 3,021,370 and Example I, below).

Pentachloro-1,3-butadienyl sulfenyl halides are made by halogenating any of the pentachloro-1,3-butadienyl t-alkyl thioethers under anhydrous conditions at —80° to 0° C. and ambient pressure.

Pentachloro-1,3-butadienyl sulfonyl halides are made by halogenating pentachloro-1,3-butadienyl t-alkyl thioethers in the presence of a normally liquid alkanoic acid containing water, e.g., aqueous acetic acid, at 0° to 25° C. and ambient pressure.

The sulfonic acid is made by hydrolyzing the pentachloro-1,3-butadienyl sulfonyl halides at temperatures which can range from 80° to 150° C. and ambient pressure. Esters (sulfonates) can be made similarly by using alkaline aqueous solutions of alcohols or, at lower temperatures, alkali metal alcoholates with the halides.

Pentachloro-1,3-butadienyl sulfonamides are made by reacting the corresponding sulfonyl halide with ammonia or an amine at a temperature of from —10° to +15° C. and, generally, ambient pressure.

It will be understood that compounds used as intermediates in the above syntheses need not be separated from the environment in which they are formed if any reaction media used are suitably chosen, e.g., a t-alkyl thioether can be produced by appropriate reaction with hexachloro-1,3-butadiene, halogenated in situ in the presence of aqueous acid, e.g., aqueous acetic acid, and the product hydrolyzed, again in situ, to form the sulfonic acid.

Equations for the reactions of this invention, using chlorine as the halogen, are as follows:

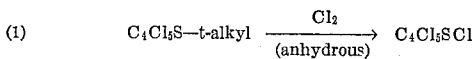

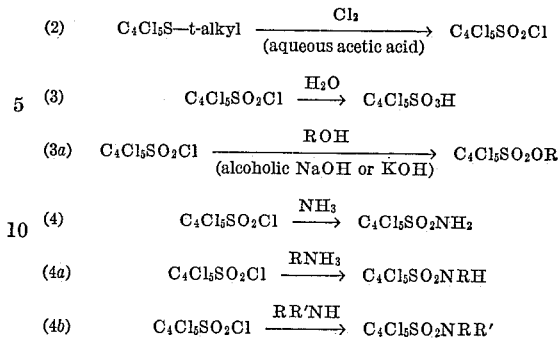

Pentachloro-1,3-butadienyl alkyl thioethers operable in the reaction of Equation 1 to produce sulfenyl halides are those which have a tertiary alkyl group with the tertiary carbon of the alkyl group linked directly to the sulfur atom. Halogens operable are those of atomic number 17–36, i.e., chlorine and bromine. The reaction is conducted under anhydrous conditions in order to avoid formation of the corresponding sulfonyl halide. Temperatures in the range of —80° to 0° C. are usually employed but there is nothing critical about this range and temperatures outside the same can be used. Ambient pressure is also usually employed but, if desired, pressures which are above atmospheric can be used. Superatmospheric pressure, however, has no practical advantage but complicates equipment requirements. The reaction is generally accomplished in a reaction medium liquid under the conditions of reaction and nonreactive with the reactants and reaction product. Suitable media are the chlorinated alkane hydrocarbons, e.g., methylene chloride carbon tetrachloride, chloroform and the like. The amount of reaction medium is not critical and it can equal or exceed the weight of pentachloro-1,3-butadienyl t-alkyl thioether by many fold.

The reaction of Equation 2, i.e., the halogenation of the pentachloro-1,3-butadienyl t-alkyl thioether in which the carbon linked to the sulfur atom is tertiary with chlorine to produce the corresponding sulfonyl halide, is accomplished in a medium which contains at least two moles of water per mole of thioether at 0° to 25° C. The medium employed is one which is water soluble and a solvent for the pentachloro-1,3-butadienyl t-alkyl thioether. Suitable media are the lower aliphatic alkanoic acids, particularly acetic and propionic acids. The amount of reaction medium is not critical and it can equal or exceed by many fold the weight of the pentachloro-1,3-butadienyl t-alkyl thioether. The halogenation is generally carried out at ambient pressure but if desired pressures in excess of atmospheric can be used but this has no practical advantage.

The reaction of Equation 3 is accomplished by the heat treatment at reflux of an aqueous solution of the pentachloro-1,3-butadienyl sulfonyl halide for from 1 to 20 hours to produce the sulfonic acid. The amount of water used is at least that stoichiometrically equivalent of the pentachloro-1,3-butadienyl sulfonyl halide. Larger amounts than the theoretically required amount are generally used, however, the excess acting as a reacting medium. The sulfonic acid is recovered from the reaction mixture by gradually removing the water and hydrogen halide formed by heat treatment, generally under reduced pressure. There is nothing critical about this recovery procedure and other methods known to those skilled in the art can be used. Sulfonates can be prepared (Equation 3a) under essentially the same conditions used for preparing the sulfonic acid, employing an alcohol in place of water. Alternatively, an alkali metal alcoholate can be used in place of the alcohol.

The pentachloro-1,3-butadienyl sulfonamides are made according to Equation 4, 4a or 4b by reacting a pentachloro-1,3-butadienyl sulfonyl halide with ammonia or primary or secondary amine in solution in a medium which is solvent for the ammonia or amine. Water is a satisfactory medium and the reaction is therefore generally carried out in an aqueous system. The amount of ammonia or amine is from one to two moles per mole of pentachloro-1,3-butadienyl sulfonyl halide. Amounts outside this value can be used, if desired, and the excess removed after reaction is complete. The amount of water or other reaction medium is not critical and it can equal or exceed by many fold the weight of the pentachloro-1,3-butadienyl sulfonyl halide. Suitable primary and secondary amines are the alkyl amines, especially those containing up to 18 carbon atoms in the alkyl group. Examples of such amines are methyl-, ethyl-, propyl-, hexyl-, decyl-, dodecyl- and octadecylamines, dibutylamine, methylhexylamine, dioctylamine, and the like. Although the amidation of sulfonyl halide is usually carried out at ambient pressure, in the case of highly volatile amines it is desirable to carry out the reaction in a closed system under autogenous pressure.

The examples which follow are submitted to illustrate but not to limit the invention. In these examples, pressures are ambient atmospheric unless otherwise specified.

EXAMPLE I

A mixture of 52.2 g. (0.2 mole) of hexachloro-1,3-butadiene, 100 ml. of absolute ethyl alcohol, and 18 g. (0.2 mole) of t-butyl mercaptan was heated to reflux (70° C.) and stirred, while a solution of 8 g. (0.2 mole) of sodium hydroxide in 100 ml. of absolute ethyl alcohol was added. Sodium chloride formed immediately. The mixture was stirred and refluxed 30 minutes beyond the time required to carry out the addition. The product was poured into ice water and the organic material extracted twice with carbon tetrachloride. The extracts were combined, washed with water, dried over anhydrous magnesium sulfate, and distilled. The product, pentachloro-1,3-butadienyl t-butyl thioether, distilled at 101° to 102° C./1.2 mm. and weighed 11.3 g., $n_D^{25}$, 1.5568.

*Analysis.*—Calcd. for $C_8H_9Cl_5S$: Cl, 56.37%; S, 10.20%. Found: Cl, 53.71%; S, 10.74%.

Nuclear magnetic resonance examination showed one kind of hydrogen typical of the tertiary butyl group.

EXAMPLE II

A solution of the sodium salt of methyl mercaptan was prepared by dissolving 40 g. (1 mole) of sodium hydroxide in 450 ml. of absolute ethyl alcohol, followed by addition at −10° C. of 48 g. (1 mole) of methyl mercaptan. This solution was added over a period of one hour to a refluxing mixture of 392 g. (1.5 moles) of hexachloro-1,3-butadiene in 300 ml. of absolute ethyl alcohol. The dark brown reaction mixture was poured into an ice/water mixture and the lower organic layer was removed. The aqueous layer was extracted twice with chloroform and the extracts combined with the organic layer, washed with 5% sodium hydroxide, dried over anhydrous magnesium sulfate, and distilled. The major product was pentachloro-1,3-butadienyl methyl thioether, B.P. 102° to 108° C./3 mm.; $n_D^{25}$, 1.5969; yield 97 g. (36%).

*Analysis.*—Calcd. for $C_5H_3Cl_5S$: Cl, 65.05%; S, 11.77%. Found: Cl, 63,49%; S, 12.08%.

The infrared absorption spectrum has bands at 6.2μ and at 6.45μ, suggesting a diene structure; C—H and C—Cl bands were located at 3.3μ and the 12μ region, respectively. The ultraviolet absorption spectrum shows peaks at 2760 A. and at 2220 A.

The minor reaction product was dimethylmercaptotetrachloro-1,3-butadienyl, B.P. 130° to 132° C./2.5 mm. $n_D^{25}$, 1.6153 (11%).

*Analysis.*—Calcd. for $C_6H_6Cl_4S_2$: Cl, 49.94%, S, 22.58. Found: Cl, 48.67%; S, 23.06%.

Other thioethers can be obtained by the process of Example II merely by substituting the appropriate mercaptan for methyl mercaptan, e.g., pentachloro-1,3-butadienyl hexyl thioether from hexyl mercaptan, the corresponding octyl thioether from octyl mercaptan, the dodecyl thioether from dodecyl mercaptan, the octadecyl thioether from octadecyl mercaptan, cyclohexyl thioether from cyclohexyl mercaptan, etc.

EXAMPLE III

Two and one tenth g. (0.3 mole) of chlorine was slowly distilled into 9 g. (0.029 mole) of the pentachloro-1,3-butadienyl t-butyl thioether, prepared as in Example I, at −60° C. The reaction product became dark orange in color. After warming to 25° C., the mixture was distilled, B.P. 73° to 76° C./0.4 mm., 3,2 g.; $n_D^{25}$, 1.6050. The odorous product, pentacholor-1,3-butadienyl sulfenyl chloride, analyzes as follows.

*Analysis.*—Calcd. for $C_4Cl_6S$: S, 10.94%. Found: S, 10.50%.

The infrared absorption spectrum has bands indicative of double bonds at 6.20μ, 6.45μ, 6.15μ, 6.30μ, and 6.55μ as well as C—Cl bands in the 12μ.

EXAMPLE IV

To a mixture of 31.4 g. (0.1 mole) of pentachlorobutadienyl t-1,3-butyl thioether, prepared as in Example I, in 100 ml. of acetic acid containing 2 g. of water, was added 21 g. (0.3 mole) of chlorine over a period of one hour. The temperature of the reaction mixture was maintained at 15° C. by an ice bath and as the reaction progressed, more water was added. The reaction mixture was added to ice water and extraced with carbon tetrachloride. The extract was dried over anhydrous magnesium sulfate and distilled. The product, pentachloro-1,3-butadienyl sulfonyl chloride, distilled at 79° to 83° C./0.4 mm.; $n_D25$, 1.5663; yield 23 g. (71%).

*Analysis.*—Calcd. for $C_4Cl_6SO_2$: Cl, 65.48% S, 9.87%. Found: Cl, 64.80%; S, 10.30%.

The infrared absorption spectrum has the expected bands due to unsaturation at 6.2μ and 6.45μ as well as bands at 7.1μ and 8.4μ due to a sulfone group influenced by a chlorine attached to it.

EXAMPLE V

To 9 g. of the pentachloro-1,3-butadienyl sulfonyl chloride, prepared as in Example IV, there was added water and the mixture heated at reflux with stirring for 20 hours. The water and hydrogen chloride were removed by slowly heating the material to 50° C./1 mm. There remained 7.5 g. of a light brown, waxy, solid which melted near 40° C. The product, pentachloro-1,3-butadienyl sulfonic acid, analyzed as follows.

*Analysis.*—Calcd. for $C_4Cl_5SO_3H \cdot 3.5H_2O$: Cl, 50.15%; S, 9.07%. Found: Cl, 49.36%; S, 9.27%.

EXAMPLE VI

To 30 ml. of 28% aqueous ammonium hydroxide at 0° C. there was added 2.5 g. of the pentachloro-1,3-butadienyl sulfonyl chloride prepared as the Example IV. The white crystalline solid which formed was collected by filtration. The product, pentachloro-1,3-butadienyl sulfonamide, was purified by recrystallizing it twice from water. The purified product melted at 136° to 137° C.

*Analysis.*—Calcd. for $C_4H_2Cl_5NO_2S$: Cl, 58.05%; N, 4.59%; S, 10.50%. Found: Cl, 58.35%; N,4.85%; S, 10.89%.

Infrared examination of the product showed bands at 6.45µ typical of conjugated unsaturation; at 6.2µ typical for NH₂; and at 8.5µ typical for sulfonamide group.

Replacement of the amonnia of Example VI in the process of Example VI by the amines listed in the left column of Table I will produce the amides shown in the right column.

*Table I*

| Amine | Product |
| --- | --- |
| Methylamine | Pentachloro-1,3-butadienyl N-methylsulfonamide. |
| Octylamine | Pentachloro-1,3-butadienyl N-octylsulfonamide. |
| Didodecylamine | Pentachloro-1,3-butadienyl N-didodecylsulfonamide. |
| Aniline | Pentachloro-1,3-butadienyl N-phenylsulfonamide. |
| Methylaniline | Pentachloro-1,3-butadienyl N-methylphenylsulfonamide. |
| Dimethylamine | Pentachloro-1,3-butadienyl N,N-dimethylsulfonamide. |

Replacement of the water of Example V by the alcohols listed in the left column of Table II will produce the sulfonates listed in the right column.

*Table II*

| Alcohol | Product |
| --- | --- |
| Methanol | Methyl pentachloro-1,3-butadiene sulfonate. |
| Butanol | Butyl pentachloro-1,3-butadenyl sulfonate. |
| Cyclohexanol | Cyclohexyl pentachloro-1,3-butadienyl sulfonate. |
| Benzyl alcohol | Benzyl pentachloro-1,3-butadienyl sulfonate. |

The products of this invention are generally useful to impart flame-proofness to paper. Thus, paper which has been treated with the products of this invention will not support combustion.

Pentachloro-1,3-butadienyl sulfenyl chloride also reacts with hydrocarbon elastomers, e.g., crepe rubber, to form flame-resistant plastic polymers, as illustrated below:

To a solution of 2 g. of crepe rubber in 150 ml. of dry toluene was added at room temperature 1.4 g. of pentachlorobutadienyl sulfenyl chloride. The orange-yellow color of the sulfenyl chloride faded in 10 minutes and after standing one hour, the polymer was precipitated by adding acetone. The polymer was washed with acetone and dried for three hours at 100° C. under 0.5 mm.

*Analysis.*—Found: 3.67% S and 27.41% Cl.

The product contains 35% combined sulfenyl chloride and is now difficult to ignite.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

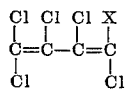

wherein X is selected from the group consisting of —SCl, —SO₂Cl, —SO₂OR′, and —SO₂NR′₂, R′ being selected from the group consisting of hydrogen and hydrocarbon of up to 7 carbons.

2. Pentachloro-1,3-butadienyl sulfenyl chloride.
3. Pentachloro-1,3-butadienyl sulfonyl chloride.
4. Pentachloro-1,3-butadienyl sulfonic acid.
5. Pentachloro-1,3-butadienyl sulfonamide.
6. Pentachloro-1,3-butadienyl t-butyl thioether.
7. The process of producing pentachloro-1,3-butadienyl sulfenyl chloride which comprises chlorinating pentachloro-1,3-butadienyl t-butyl thioether under anhydrous conditions and at a temperature in the range of about −80° to 0° C.
8. The process of producing a sulfenyl halide which comprises reacting a member of the group consisting of chlorine and bromine with a compound of the formula $Cl_2C=CCl—ClC=CClSR_t$, where $R_t$ is tertiary alkyl in which the tertiary carbon of the alkyl group is linked directly to the sulfur atom, under anhydrous conditions and at a temperature in the range of about −80° to 0° C.
9. The process of producing a sulfonyl halide which comprises reacting a member of the group consisting of chlorine and bromine with a compound of the formula $Cl_2C=CCl—ClC=CClSR_t$, where $R_t$ is tertiary alkyl in which the tertiary carbon of the alkyl group is linked directly to the sulfur atom, in the presence of a lower alkanoic acid containing a small amount of water and at a temperature in the range of about 0° to 25° C.
10. The process of producing pentachloro-1,3-butadienyl sulfonic acid which comprises hydrolyzing a member of the group consisting of pentachloro-1,3-butadienyl sulfonyl chloride and pentachloro-1,3-butadienyl sulfonyl bromide by heating the same with water.
11. The process of producing an alkali metal sulfonate which comprises reacting a pentachloro-1,3-butadienyl sulfonyl chloride with an aqueous solution of a member of the group consisting of (1) caustic alkali and an alcohol and (2) an alkali metal alcoholate.
12. The process which comprises reacting a pentachloro-1,3-butadienyl sulfonyl halide with a member of the group consisting of ammonia and primary and secondary amines.

References Cited by the Examiner

UNITED STATES PATENTS

| | | | |
| --- | --- | --- | --- |
| 2,807,615 | 9/57 | Himel | 260—543 X |
| 2,965,535 | 12/60 | Birum | 260—543 |
| 3,021,370 | 2/62 | Bluestone | 260—607 |
| 3,064,042 | 11/62 | Serniuk | 260—543 |

OTHER REFERENCES

Karasch et al.: Chem. Reviews, vol. 39, 1946, pp. 286–287.

Reid: "Organic Chemistry of Bivalent Sulfur," vol. II, Chemical Pub. Co., New York, 1960, pages 13 and 25.

Roedig et al.: Ann. 600, 1–11 (1956), page 7 relied upon; C.A. 51: 4273g (1957).

LORRAINE A. WEINBERGER, *Primary Examiner.*
LEON ZITVER, *Examiner.*